(12) United States Patent
Markunas et al.

(10) Patent No.: US 7,132,816 B1
(45) Date of Patent: Nov. 7, 2006

(54) BRUSHLESS WOUND FIELD SYNCHRONOUS MACHINE ROTOR POSITION TRACKING WITH EXCITER STATOR CURRENT HARMONIC TRACKING

(75) Inventors: Albert L. Markunas, Roscoe, IL (US); Charles J. Romenesko, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/358,792

(22) Filed: Feb. 20, 2006

(51) Int. Cl.
*H02P 6/18* (2006.01)

(52) U.S. Cl. .................. 318/722; 318/254

(58) Field of Classification Search .............. 318/138, 318/254, 439, 720–724
See application file for complete search history.

(56) References Cited

U.S. PATENT DOCUMENTS

| | | | |
|---|---|---|---|
| 5,384,527 A * | 1/1995 | Rozman et al. | 322/10 |
| 5,585,709 A * | 12/1996 | Jansen et al. | 318/807 |
| 5,747,971 A * | 5/1998 | Rozman et al. | 322/10 |
| 6,809,496 B1 * | 10/2004 | Anghel et al. | 318/700 |
| 6,967,461 B1 * | 11/2005 | Markunas et al. | 318/700 |
| 7,034,497 B1 * | 4/2006 | Markunas et al. | 318/712 |
| 7,045,986 B1 * | 5/2006 | Anghel et al. | 318/712 |

* cited by examiner

*Primary Examiner*—Bentsu Ro
(74) *Attorney, Agent, or Firm*—Stephen G. Mican

(57) ABSTRACT

A field oriented control system for a brushless wound field synchronous machine that determines positioning of a rotor for the machine from exciter stator electrical potentials and current harmonics.

40 Claims, 1 Drawing Sheet

BRUSHLESS WOUND FIELD SYNCHRONOUS MACHINE ROTOR POSITION TRACKING WITH EXCITER STATOR CURRENT HARMONIC TRACKING

FIELD OF THE INVENTION

The invention relates to rotor angular position and velocity sensing systems for dynamoelectric machines, and more particularly to a system for resolving the position of a rotor for a wound field synchronous machine using a sensorless position sensing system even at standstill.

BACKGROUND OF THE INVENTION

Field Oriented Control (FOC) of brushless wound field synchronous machines requires position information for the transformations into and out of the d-q reference frame. Research activities surrounding position sensorless field oriented control have produced several inventive solutions. For instance, Jansen et al. (U.S. Pat. No. 5,585,709) describes a carrier injection sensorless (CIS) method of estimating the position and velocity of the rotor of a dynamoelectric machine. Most recently, Markunas et al. (U.S. Pat. No. 6,967,461) has enhanced the Jansen et al. CIS method applied to wound field synchronous machines. Specifically, Markunas et al. uses the rotating rectifier diode in the rotor field winding circuitry to determine North-South pole information by interrogating the machine from the inverter on the main armature terminals of the machine using the CIS method. Unfortunately, the CIS method places an increased peak current carrying burden on the insulated gate bipolar transistor (IGBT) switches that typically comprise the machine inverter.

SUMMARY OF THE INVENTION

The invention uses similar filtering and tracking software to track the rotating rectifier diodes as described in Markunas et al. However, the invention measures and utilises exciter stator current harmonics instead of harmonics of a carrier frequency injected in the main armature stator circuit to determine rotor position. This method reduces peak current on the machine inverter and allows tracking the rotor position even with the machine at standstill. in a possible embodiment, the invention comprises a field oriented control system for a polyphase brushless wound field synchronous machine that has a main stator, an exciter stator and a rotor assembly comprising a direct current (DC) main rotor field winding supplied by a rotating rectifier assembly that rectifies alternating current (AC) generated by an exciter rotor winding and that uses an estimated rotor position signal $\hat{\theta}$ for control of the machine, the system comprising: a first Clarke transformation that receives electrical potentials for each phase of a polyphase excitation of frequency $F_{exc}$ for the exciter stator and transforms them to an α-axis excitation potential $v_{exc\_\alpha}$ and a β-axis excitation potential $v_{exc\_\beta}$ in a two-phase α-β stationary reference frame for an exciter excitation electrical potential space vector with a fundamental frequency of $F_{exc}$; a first phase locked loop (PLL) that receives the two excitation potentials $v_{exc\_\alpha}$ and $v_{exc\_\beta}$ outputs a signal that is representative of an estimated position $\hat{\theta}_{exc}$ of the exciter excitation space vector; a harmonic filter tuned to at least one desired harmonic of the excitation frequency $F_{exc}$ that receives $\hat{\theta}_{exc}$ and passes the desired harmonic of $\hat{\theta}_{exc}$; a second Clarke transformation that receives the exciter stator current signals representative of current on each phase of the polyphase exciter excitation and transforms them to digital α-axis and β-axis exciter stator current signals $i_{exc\_\alpha}$ and $i_{exc\_\beta}$ in a two-phase stationary α-β reference frame for the exciter excitation space vector; a Park transformation that receives the digital α-axis and β-axis exciter stator current signals $i_{exc\_\alpha}$ and $i_{exc\_\beta}$ and uses the desired harmonic of $\hat{\theta}_{exc}$ to transform them to a d-axis exciter signal $i_{exc\_d}$ and q-axis exciter signal $i_{exc\_q}$ in a rotating d-q reference frame for the exciter excitation space vector harmonic; and a second PLL that receives the exciter signals $i_{exc\_d}$ and $i_{exc\_q}$ and outputs the estimated rotor position signal $\hat{\theta}$.

DETAILED DESCRIPTION OF THE INVENTION

Figure 1:
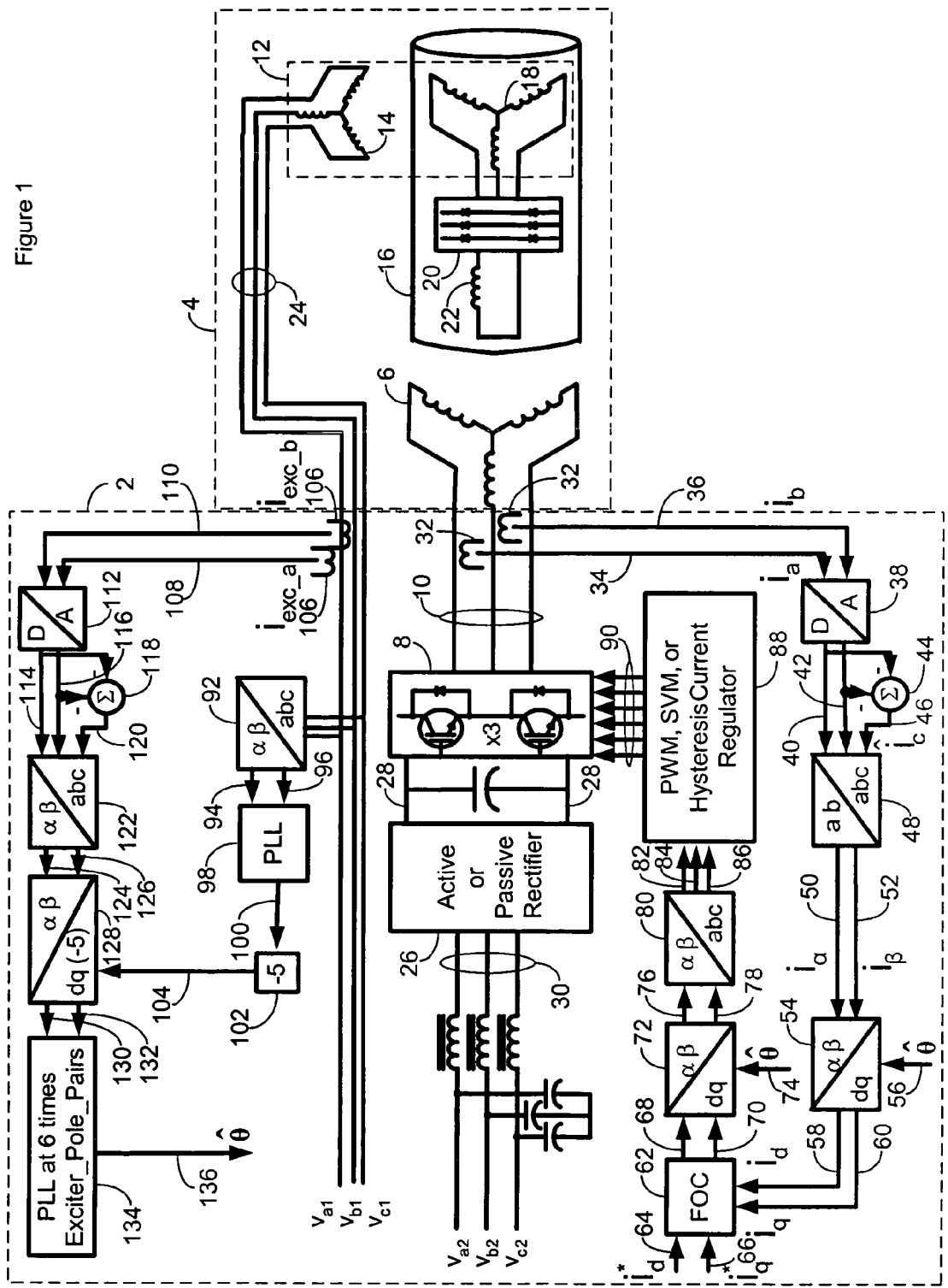
FIG. 1 is a block diagram of a field oriented controller system for a brushless wound field synchronous machine with sensorless rotor position sensing according to the invention.

FIG. 1 is a block diagram of a field oriented controller (FOC) system 2 for a brushless wound field synchronous machine 4 with sensorless rotor position sensing according to the invention. The machine 4 has a polyphase alternating current (AC) main stator 6. For purposes of example, FIG. 1 shows the machine 4 with a three phase AC main stator 6, although the main stator 6 could have two or more phases. An inverter 8 produces an AC drive signal. In this case three-phase, on inverter output lines 10, that couple to the main stator 6 to drive the machine 4. The machine 4 has an exciter 12 with a polyphase AC exciter stator 14, shown in FIG. 1 as a three-phase AC exciter stator 14 by way of example, although the exciter stator 14 could have two or more phases.

The machine 4 also has a rotor assembly 16 that comprises a polyphase AC exciter rotor winding 18, a rotating rectifier assembly 20 and a direct current (DC) main rotor field winding 22. The rotating rectifier 20 may comprise a full or half wave rectifier assembly. The rotating rectifier assembly 20 rectifies AC current induced in the exciter winding 18 to supply DC that energies the main rotor field winding 22. Three-phase AC excitation, or for that matter, any polyphase excitation or even DC excitation for high rotational speed operation, applied to exciter input lines 24 that couple to the exciter stator 14 allows the field of the main rotor winding 22 to be fully energised at zero and nominal rotary speeds.

A DC power source 26 supplies DC power to the inverter 8 by way of DC power lines 28. The DC power source 26 typically comprises an active or passive AC rectifier that rectifies AC power on AC power lines 30. Typically, the AC power on the AC power lines 30 is three-phase. The three phase exciter input power may be from an AC power source (not shown) that feeds the DC power source 26, or it may be a separate AC power source (not shown), and it may have a constant frequency, variable frequency, or inverter driven input. In any case, any selection of frequency or range of frequencies and phase rotation of the AC power source for the exciter 12 should ensure that enough excitation is available for the exciter 12 under all operating conditions.

A plurality of analogue main stator current sensors 32 measure current on at least some of the phases of the AC drive signal on the inverter output lines 10. In FIG. 1, two main stator current sensors 32 measure the current on two of the three phases of the AC drive signal. They develop analogue main stator current signals $i_a$ and $i_b$ for phases a and b of the three phases a, b and c on signal paths 34 and 36, respectively. Alternatively, three main stator current sensors 32 may measure current each phase of the AC drive signal to develop analogue main stator current signals $i_a$, $i_b$ and $i_c$ for each of the three phases a, b and c.

An analogue-to-digital (A/D) converter 38 receives the analogue main stator current signals $i_a$ and $i_b$ on signal paths 34 and 36 and converts them to respective digital main stator current signals $i_a$ and $i_b$ on signal paths 40 and 42. As well known in the art, the current in phase c of a three-phase system comprising phases a, b and c may be estimated as the sum of the negative values of current in phases a and b. Consequently, a summer 44 receives the digital main stator current signals $i_a$ and $i_b$ on signal paths 40 and 42 and adds their negative values to produce an estimated digital main stator current signal $\hat{i}_c$ for phase c on a signal path 46. Alternatively, if three of the main stator current sensors 32 measure current for each phase of the AC drive signal to develop analogue main stator current signals $i_a$, $i_b$ and $i_c$ for each of the three phases a, b and c, the A/D converter 44 may generate a digital main stator current signal $i_c$ directly onto the signal path 46.

A Clarke transformation 48 receives the digital main stator current signals $i_a$, $i_b$ and $\hat{i}_c$ on signal paths 40, 42 and 46 and transforms them to digital α-axis and β-axis current signals $i_\alpha$ and $i_\beta$ in a two-phase stationary α-β reference frame for the machine 4 on signal paths 50 and 52, respectively. A Park transformation 54 receives the digital α-axis and β-axis current signals $i_\alpha$ and $i_\beta$ on the signal paths 50 and 52, and using an estimated rotor position signal $\hat{\theta}$ that it receives on a signal path 56, transforms them to a d-axis flux producing current signal $i_d$ and q-axis torque producing current signal $i_q$ in a rotating d-q reference frame for the machine 4 on signal paths 58 and 60, respectively.

A FOC 62 receives a flux producing current command signal $i_d^*$ on a signal path 64 and a torque producing current command signal $i_q^*$ on a signal path 66. The FOC 62 also receives the d-axis flux producing current signal $i_d$ and q-axis torque producing current signal $i_q$ on the signal paths 58 and 60. The FOC 62 compares the flux producing current command signal $i_d^*$ with the flux producing current signal $i_d$ and the torque producing current command signal $i_q^*$ with the torque producing current signal $i_q$ and generates d-axis and q-axis space vector electrical potential command signals $v_d^*$ and $v_q^*$ on signal paths 68 and 70, respectively. An inverse Park transformation 72 receives the d-axis and q-axis space vector electrical potential command signals $v_d^*$ and $v_q^*$ on signal paths 68 and 70, and using an estimated rotor position signal $\hat{\theta}$ that it receives on a signal path 74, transforms then to α-axis and β-axis space vector electrical potential command signals $v_\alpha^*$ and $v_\beta^*$ in the stationary α-β reference frame for the machine 4 on signal paths 76 and 78, respectively.

An inverse Clarke transformation 80 receives the α-axis and β-axis space vector electrical potential command signals $v_\alpha^*$ and $v_\beta^*$ on the signal paths 76 and 78 and transforms them to three-phase space vector electrical potential command signals $v_a^*$, $v_b^*$ and $v_c^*$ on signal paths 82, 84 and 86, respectively. A modulator 88, such as a pulse width modulator (PWM) or a space vector modulator (SVM), receives the three-phase space vector electrical potential command signals $v_a^*$, $v_b^*$ and $v_c^*$ on signal paths 82, 84 and 86 and converts them to inverter modulator signals on signal paths 90. The inverter 8 receives the inverter modulator signals on the signal paths 90 and generates the AC drive signal on the signal paths 10 in accordance with the inverter modulator signals.

Alternatively, the modulator 88 may comprise a hysteresis current regulator by directly receiving the digital main stator current signals $i_a$, $i_b$ and $\hat{i}_c$ on the signal paths 40, 42, and 46, along with the transformed flux producing current command signal $i_d^*$ on the signal path 64 and the torque producing current command signal $i_q^*$ on the signal path 66 through the inverse Park transformation 72 and the inverse Clark transformation 80. The modulator 88 would then perform bang—bang current regulation of the command versus actual currents resulting in the inverter modulator signals on the signal paths 90.

Of course, the operation of the FOC system 2 as so far described requires the estimated rotor position signal $\hat{\theta}$ on the signal paths 56 and 74 for the Park transformation 54 and the inverse Park transformation 72, respectively. The invention generates the estimated rotor position signal $\hat{\theta}$ using harmonics of the fundamental frequency of the three-phase excitation on the exciter input lines 24 as follows.

The rotating rectifier assembly 20 generates harmonics of the fundamental frequency of the three-phase excitation on the exciter input lines 24 applied to the exciter stator 14 and induced into the exciter rotor winding 18. These harmonics reflect back into the exciter rotor winding 18 to induce corresponding harmonics into the exciter stator 14 and they appear on the exciter input lines 24.

If the rotating rectifier 20 comprises a full bridge six pulse rectifier, the rotating rectifier 20 produces significant harmonics of the three-phase excitation frequency $F_{exc}$ at frequencies of $F_{exc}-(6{\times}F_{exc})$ and $F_{exc}+(6{\times}F_{exc})$, the $-5^{th}$ and $+7^{th}$ harmonics of $F_{exc}$. It also produces less significant harmonics at higher harmonics, such as the $-11^{th}$ at a frequency of $F_{exc}-(12{\times}F_{exc})$ and the $+13^{th}$ at a frequency of $F_{exc}-(12{\times}F_{exc})$. Once the rotor assembly 16 begins to rotate, the exact frequency of the harmonics of $F_{exc}$ on the exciter stator 14 and applied to the exciter input lines 24 increases or decreases in frequency as a result of whether rotation of the rotor assembly 16 is in the opposite direction or in the same direction as the phase sequence rotation of the exciter stator polyphase excitation. With positive (CCW) phase sequence rotation of the exciter stator polyphase excitation, clockwise (CW) rotation of the rotor assembly 16 increases and counterclockwise rotation of the rotor assembly 16 decreases the frequency of the harmonics of $F_{exc}$ on the exciter stator 14.

For instance, with CW rotation, the $-5^{th}$ harmonic of $F_{exc}$ shall have a frequency of $F_{exc}-(6{\times}F_{exc})-(6{\times}P{\times}F_{rotor})$ and the $+7^{th}$ harmonic of $F_{exc}$ shall have a frequency of $F_{exc}+(6{\times}F_{exc})+(6{\times}R{\times}F_{rotor})$, wherein P is the number of pole pairs in the exciter 12 and $F_{rotor}$ is the rotational frequency of the rotor assembly 16. Likewise, for CCW rotation, the $-5^{th}$ harmonic of $F_{exc}$ shall have a frequency of $F_{exc}-(6{\times}F_{exc})+(6{\times}P{\times}F_{rotor})$ and the $+7^{th}$ harmonic of $F_{exc}$ shall have a frequency of $F_{exc}+(6{\times}F_{exc})-(6{\times}P{\times}F_{rotor})$, wherein P is the number of pole pairs in the exciter 12 and $F_{rotor}$ is the rotational frequency of the rotor assembly 16. Similarly, for CW rotation the less significant $-11^{th}$ and $+13^{th}$ harmonics of $F_{exc}$ shall have frequencies of $F_{exc}-(12{\times}F_{exc})-(12{\times}P{\times}F_{rotor})$ and $F_{exc}+(12{\times}F_{exc})+(12{\times}P{\times}F_{rotor})$, respectively, and for CW rotation they shall have frequencies of frequencies of $F_{exc}-(12{\times}F_{exc})+(12{\times}P{\times}F_{rotor})$ and $F_{exc}+(12{\times}F_{exc})+(12{\times}P{\times}F_{rotor})$, respectively. It may be desirable for certain applications, such as operation of the machine 4 at high rotational speeds, to reduce the frequency $F_{exc}$ of the three-phase excitation described above to zero, which constitutes a non-rotating or constant polyphase excitation waveform, that is, DC excitation. Therefore, for DC excitation applied to the exciter input lines 24 the exciter frequency $F_{exc}$ is zero in the above expressions for harmonics on the exciter input lines 24. DC excitation applied across any two of the exciter input lines 24 or from any one to the other two exciter input lines 24 tied together may serve this purpose. Alternatively, an inverter (not shown) with input modulation patterns that constitute a non-rotating or constant polyphase excitation waveform may supply excitation on the exciter input lines 24.

Although any of the harmonics of $F_{exc}$ are usable for determining the estimated rotor position signal $\hat{\theta}$, the $-5^{th}$ and $+7^{th}$ are most useful due to their more significant amplitudes. In any case, viewing a harmonic of $F_{exc}$ in reference frame for that harmonic, a phase locked loop (PLL) can track the frequency deviation and phase of a harmonic of $F_{exc}$ due to rotation of the rotor assembly 16 and derive the estimated rotor position signal $\hat{\theta}$. For instance, viewing the $-5^{th}$ harmonic of $F_{exc}$ in the $-5 \times F_{exc}$ reference frame, a PLL tuned to $-6 \times P \times F_{rotor}$ may output a signal representative of the estimated rotor position signal $\hat{\theta}$ for CW rotation of the rotor assembly 16. Similarly, the invention may use other harmonics of $F_{exc}$ to derive the estimated rotor position signal $\hat{\theta}$.

FIG. 1 shows an example of deriving the estimated rotor position signal $\hat{\theta}$ that uses the $-5^{th}$ harmonic of $F_{exc}$ as described above. A Clarke transformation 92 receives the electrical potentials of the three-phase excitation of frequency $F_{exc}$ on exciter input lines 24 and transforms them to an α-axis excitation potential $v_{exc\_\alpha}$ and a β-axis excitation potential $v_{exc\_\beta}$ in a two-phase α-β stationary reference frame for an exciter excitation electrical potential space vector on signal paths 94 and 96, respectively. A PLL 98 receives the two excitation potentials $v_{exc\_\alpha}$ and $v_{exc\_\beta}$ on the signal paths 94 and 96 and outputs a signal on a signal path 100 that is representative of an estimated position $\hat{\theta}_{exc}$ of the exciter excitation space vector. A harmonic filter 102 tuned to the $-5^{th}$ harmonic of $F_{exc}$ receives $\hat{\theta}_{exc}$ on the signal path 102 and passes the $-5^{th}$ harmonic of $\hat{\theta}_{exc}$ on a signal path 104.

A plurality of analogue exciter stator current sensors 106 measure current on at least some of the phases of the three-phase excitation on the exciter input lines 24. In FIG. 1, two exciter stator current sensors 106 measure the current on two of the three phases of the three-phase excitation. They develop analogue exciter stator current signals $i_{exc\_a}$ and $i_{exc\_b}$ for phases a and b of the three phases a, b and c on signal paths 108 and 110, respectively. Alternatively, three exciter stator current sensors 106 may measure current each phase of the AC drive signal to develop analogue exciter stator current signals $i_{exc\_a}$, $i_{exc\_b}$ and $i_{exc\_c}$ for each of the three phases a, b and c.

An analogue-to-digital (A/D) converter 112 receives the analogue exciter stator current signals $i_{exc\_a}$ and $i_{exc\_b}$ on signal paths 108 and 110 and converts them to respective digital exciter stator current signals $i_{exc\_a}$ and $i_{excb}$ on signal paths 114 and 116. As well known in the art, the current in phase c of a three-phase system comprising phases a, b and c may be estimated as the sum of the negative values of current in phases a and b. Consequently, a summer 118 receives the digital exciter stator current signals $i_{exc\_a}$ and $i_{exc\_b}$ on signal paths 114 and 116 and adds their negative values to produce an estimated digital exciter stator current signal $\hat{i}_{exc\_c}$ for phase c on a signal path 120. Alternatively, if three of the exciter stator current sensors 106 measure current for each phase of the AC drive signal to develop analogue exciter stator current signals $i_{exc\_a}$, $i_{exc\_b}$ and $i_{exc\_c}$ for each of the three phases a, b and c, the A/D converter 112 may generate a digital exciter stator current signal $i_{exc\_c}$ directly onto the signal path 120.

A Clarke transformation 122 receives the digital exciter stator current signals $i_{exc\_a}$, $i_{exc\_b}$ and $\hat{i}_{exc\_c}$ on signal paths 114, 116 and 120 and transforms them to digital α-axis and β-axis exciter current signals $i_{exc\_\alpha}$ and $i_{exc\_\beta}$ in a two-phase stationary α-β reference frame for the exciter excitation space vector on signal paths 124 and 126, respectively. A Park transformation 128 receives the digital α-axis and β-axis exciter current signals $i_{exc\_\alpha}$ and $i_{exc\_\beta}$ on the signal paths 124 and 126, and using the $-5^{th}$ harmonic of $\hat{\theta}_{exc}$ on a signal path 104, transforms them to a d-axis exciter signal $i_{exc\_d}$ and q-axis exciter signal $i_{exc\_q}$ in a rotating d-q reference frame for the exciter excitation space vector harmonicon signal paths 130 and 132, respectively. $i_{exc\_d}$ and $i_{exc\_q}$ carry position information $-(6 \times P \times F_{rotor})$ as described above. A PLL 134 tuned to $-(6 \times P \times F_{rotor})$ receives $i_{exc\_d}$ and $i_{exc\_q}$ on the signal paths 130 and 132 and outputs the estimated rotor position signal $\hat{\theta}$ for the rotor assembly 16 on a signal path 136. The estimated rotor position signal $\hat{\theta}$ on the signal path 136 connects to the signal paths 56 and 74 to provide the Park transformation 54 and the inverse Park transformation 72 with the estimated rotor position signal $\hat{\theta}$ as described above.

Specific combinations of the number of pole pairs for the main stator 6 and number of pole pairs for the exciter stator 14 are required for unambiguous determination of the electrical position of the rotor assembly 16. In the above example, an exciter stator 14 with one pole pair may produce position information at a frequency of $-(6 \times 1 \times F_{rotor})$. Since the angle information will be present at 6 times the rotation frequency, a machine with a main stator 6 that has 6 pole pairs having an electrical frequency of 6 times the rotational frequency may use the estimated rotor position signal $\hat{\theta}$ generated by the PLL 134 directly. Similarly, an exciter stator 14 with 2 pole pairs may produce position information at a frequency of $-(6 \times 2 \times F_{rotor})$ so that a main stator 6 with 12 pole pairs would similarly be ideal.

A slight alteration to the configuration shown in FIG. 1 may allow higher numbers of pole pairs for the exciter stator 12 and/or lower numbers of pole pairs for the main stator 6. If the rotating rectifier 20 comprises a half bridge three-pulse rectifier, thereby making use of the centre leg of the Y connection of the exciter rotor winding 18, the number of pulses decreases from 6 to 3. Then, an exciter stator 14 with one pole pair may match with a main stator 6 with only 3 pole pairs.

Described above is a field oriented control system for a brushless wound field synchronous machine that determines positioning of a rotor for the machine from exciter stator electrical potentials and current harmonics. The described embodiments of the invention are only some illustrative implementations of the invention wherein changes and substitutions of the various parts and arrangement thereof are within the scope of the invention as set forth in the attached claims.

What is claimed is:

1. A field oriented control (FOC) system for a polyphase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, the system comprising:

a first Clarke transformation that receives electrical potentials for each phase of a polyphase excitation of frequency $F_{exc}$ for the exciter stator and transforms them to an α-axis excitation potential $v_{exc\_\alpha}$ and a β-axis excitation potential $v_{exc\_\beta}$ in a two-phase α-β stationary reference frame an exciter excitation electrical potential space vector with fundamental frequency $F_{exc}$;

a first phase locked loop (PLL) that receives the two excitation potentials $v_{exc\_\alpha}$ and $v_{exc\_\beta}$ outputs a signal that is representative of an estimated position $\hat{\theta}_{exc}$ of the exciter excitation space vector;

a harmonic filter tuned to at least one desired harmonic of the excitation frequency $F_{exc}$ that receives the signal that is representative of the estimated position $\hat{\theta}_{exc}$ and passes the desired harmonic of $\hat{\theta}_{exc}$;

a second Clarke transformation that receives the exciter stator current signals representative of current on each phase of the polyphase exciter excitation and transforms them to digital α-axis and β-axis exciter current signals $i_{exc\_\alpha}$ and $i_{exc\_\beta}$ in a two-phase stationary α-β reference frame for the exciter excitation space vector;

a Park transformation that receives the digital α-axis and β-axis exciter current signals $i_{exc\_\alpha}$ and uses the desired harmonic of $\hat{\theta}_{exc}$ to transform them to a d-axis exciter signal $i_{exc\_d}$ and q-axis exciter signal $i_{exc\_q}$ in a rotating d-q reference frame of the exciter excitation space vector harmonic; and a second PLL that receives the signals $i_{exc\_d}$ and $i_{exc\_q}$ and outputs the estimated rotor position signal $\hat{\theta}$.

2. The FOC system of claim 1, wherein the polyphase synchronous machine comprises a three-phase synchronous machine.

3. The FOC system of claim 1, wherein the polyphase excitation for the exciter stator comprises three-phase excitation.

4. The FOC system of claim 1, wherein the polyphase excitation for the exciter stator comprises a non-rotating polyphase excitation waveform with fundamental frequency $F_{exc}$ of zero.

5. The FOC system of claim 4, wherein DC excitation provides the non-rotating polyphase excitation waveform.

6. The FOC system of claim 1, wherein the desired harmonic of the excitation frequency $F_{exc}$ is selected from the $-5^{th}$, $+7^{th}$, $-11^{th}$ and $+13^{th}$ harmonics of the excitation frequency $F_{exc}$.

7. The FOC system of claim 6, wherein the desired harmonic of the excitation frequency $F_{exc}$ is the $-5^{th}$ harmonic of the excitation frequency $F_{exc}$.

8. The FOC system of claim 6, wherein the desired harmonic of the excitation frequency $F_{exc}$ is the $+7^{th}$ harmonic of the excitation frequency $F_{exc}$.

9. A field oriented control (FOC) system for a three-phase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, the system comprising:

a first Clarke transformation that receives electrical potentials for each phase of a three-phase excitation of frequency $F_{exc}$ for the exciter stator and transforms them to an α-axis excitation potential $v_{exc\_\alpha}$ and a β-axis excitation potential $v_{exc\_\beta}$ in a two-phase α-β stationary reference frame for an exciter excitation electrical potential space vector with fundamental frequency $F_{exc}$;

a first phase locked loop (PLL) that receives the two excitation potentials $v_{exc\_\alpha}$ and $v_{exc\_\beta}$ outputs a signal that is representative of an estimated position $\hat{\theta}_{exc}$ of the exciter excitation space vector;

a harmonic filter tuned to at least one desired harmonic of the excitation frequency $F_{exc}$ selected from the $-5^{th}$, $+7^{th}$, $-11^{th}$, and $+13^{th}$ harmonics of the excitation frequency $F_{exc}$ that receives $\hat{\theta}_{exc}$ and passes the desired harmonic of $\hat{\theta}_{exc}$;

a second Clarke transformation that receives the exciter stator current signals representative of current on each phase of the polyphase exciter excitation and transforms them to digital α-axis and β-axis exciter current signals $i_{exc\_\alpha}$ and $i_{exc\_\beta}$ in a two-phase stationary α-β reference frame for the exciter excitation space vector;

a Park transformation that receives the digital α-axis and β-axis exciter current signals $i_{exc\_\alpha}$ and uses the desired harmonic of $\hat{\theta}_{exc}$ to transform them to a d-axis exciter signal $i_{exc\_d}$ and q-axis exciter signal $i_{exc\_q}$ in a rotating d-q reference frame for the exciter excitation space vector harmonic; and a second PLL that receives the exciter signals $i_{exc\_d}$ and $i_{exc\_q}$ and outputs the estimated rotor position signal $\hat{\theta}$.

10. The FOC system of claim 9, wherein the desired harmonic of the excitation frequency $F_{exc}$ is the $-5^{th}$ harmonic of the excitation frequency $F_{exc}$.

11. The FOC system of claim 9, wherein the desired harmonic of the excitation frequency $F_{exc}$ is the $+7^{th}$ harmonic of the excitation frequency $F_{exc}$.

12. For a field oriented control (FOC) system usable with a polyphase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, apparatus for generating the estimated rotor position signal $\hat{\theta}$ comprising:

a first Clarke transformation that receives electrical potentials for each phase of a polyphase excitation of frequency $F_{exc}$ for the exciter stator and transforms them to an α-axis excitation potential $v_{exc\_\alpha}$ and a β-axis excitation potential $v_{exc\_\beta}$ in a two-phase α-β stationary reference frame for an exciter electrical potential space vector with fundamental frequency $F_{exc}$;

a first phase locked loop (PLL) that receives the two excitation potentials $v_{exc\_\alpha}$ and $v_{exc\_\beta}$ outputs a signal that is representative of an estimated position $\hat{\theta}_{exc}$ of the exciter excitation space vector;

a harmonic filter tuned to at least one desired harmonic of the excitation frequency $F_{exc}$ that receives $\hat{\theta}_{exc}$ and passes the desired harmonic of $\hat{\theta}_{exc}$;

a second Clarke transformation that receives the exciter stator current signals representative of current on each phase of the polyphase exciter excitation and transforms them to digital α-axis and β-axis exciter current signals $i_{exc\_\alpha}$ and $i_{exc\_\beta}$ in a two-phase stationary α-β reference frame for the exciter excitation space vector;

a Park transformation that receives the digital α-axis and β-axis exciter current signals $i_{exc\_\alpha}$ and uses the desired harmonic of $\hat{\theta}_{exc}$ to transform them to a d-axis exciter signal $i_{exc\_d}$ and q-axis exciter signal $i_{exc\_q}$ in a rotating d-q reference frame for the exciter excitation space vector harmonic; and a second PLL that receives the exciter signals $i_{exc\_d}$ and $i_{exc\_q}$ and outputs the estimated rotor position signal $\hat{\theta}$.

13. The apparatus of claim 12, wherein the polyphase synchronous machine comprises a three-phase synchronous machine.

14. The apparatus of claim 12, wherein the polyphase excitation for the exciter stator comprises a three-phase excitation.

15. The apparatus of claim 12, wherein the at least one desired harmonic of the excitation frequency $F_{exc}$ is selected from the $-5^{th}$, $+7^{th}$, $-11^{th}$ and $+13^{th}$ harmonics of the excitation frequency $F_{exc}$.

16. The apparatus of claim 15, wherein the desired harmonic of the excitation frequency $F_{exc}$ is the $-5^{th}$ harmonic of the excitation frequency $F_{exc}$.

17. The apparatus of claim 15, wherein the desired harmonic of the excitation frequency $f_{exc}$ is the $+7^{th}$ harmonic of the excitation frequency $F_{exc}$.

18. For a field oriented control (FOC) system usable with a three-phase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, apparatus for generating the estimated rotor position signal $\hat{\theta}$ comprising:
a first Clarke transformation that receives electrical potentials for each phase of a three-phase excitation of frequency $F_{exc}$ for the exciter stator and transforms them to an $\alpha$-axis excitation potential $v_{exc\_\alpha}$ and a $\beta$-axis excitation potential $v_{exc\_\beta}$ in a two-phase $\alpha$-$\beta$ stationary reference frame for an exciter excitation electrical potential space vector with fundamental frequency $F_{exc}$;
a first phase locked loop (PLL) that receives the two excitation potentials $v_{exc\_\alpha}$ and $v_{exc\_\beta}$ outputs a signal that is representative of an estimated position $\hat{\theta}_{exc}$ of the exciter excitation space vector;
a harmonic filter tuned to at least one desired harmonic of the excitation frequency $F_{exc}$ selected from the $-5^{th}$, $+7^{th}$, $-11^{th}$, and $+13^{th}$ harmonics of the excitation frequency $F_{exc}$ that receives $\hat{\theta}_{exc}$ and passes the desired harmonic of $\hat{\theta}_{exc}$;
a second Clarke transformation that receives the exciter stator current signals representative of current on each phase of the polyphase exciter excitation and transforms them to digital $\alpha$-axis and $\beta$-axis exciter current signals $i_{exc\_\alpha}$ and $i_{exc\_\beta}$ in a two-phase stationary $\alpha$-$\beta$ reference frame for the exciter excitation space vector;
a Park transformation that receives the digital $\alpha$-axis and $\beta$-axis exciter current signals $i_{exc\_\alpha}$ and uses the desired harmonic of $\hat{\theta}_{exc}$ to transform them to a d-axis exciter signal $i_{exc\_d}$ and q-axis exciter signal $i_{exc\_q}$ in a rotating d-q reference frame for the exciter excitation space vector harmonic; and
a second PLL that receives the exciter signals $i_{exc\_d}$ and $i_{exc\_q}$ and outputs the estimated rotor position signal $\hat{\theta}$.

19. The apparatus of claim 18, wherein the desired harmonic of the excitation frequency $F_{exc}$ is the $-5^{th}$ harmonic of the excitation frequency $F_{exc}$.

20. The apparatus of claim 18, wherein the desired harmonic of the excitation frequency $F_{exc}$ is the $+7^{th}$ harmonic of the excitation frequency $F_{exc}$.

21. A method of field oriented control (FOC) for a polyphase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, the method comprising the steps of:
transforming electrical potentials for each phase of a polyphase excitation of frequency $F_{exc}$ for the exciter stator to an $\alpha$-axis excitation potential $v_{exc\_\alpha}$ and a $\beta$-axis excitation potential $v_{exc\_\beta}$ in a two-phase $\alpha$-$\beta$ stationary reference frame for an electrical potential space vector with fundamental frequency $F_{exc}$;
applying the two excitation potentials $v_{exc\_\alpha}$ and $v_{exc\_\beta}$ to a phase locked loop (PLL) to output a signal that is representative of an estimated position $\hat{\theta}_{exc}$ of the exciter excitation space vector;
filtering the signal representative of the estimated position $\hat{\theta}_{exc}$ to pass at least one desired harmonic of $\hat{\theta}_{exc}$;
transforming the exciter stator current signals representative of current on each phase of the polyphase exciter excitation to digital $\alpha$-axis and $\beta$-axis exciter current signals $i_{exc\_\alpha}$ and $i_{exc\_\beta}$ in a two-phase stationary $\alpha$-$\beta$ reference frame for the exciter excitation space vector;
transforming the digital $\alpha$-axis and $\beta$-axis exciter current signals $i_{exc\_\alpha}$ with the desired harmonic of $\hat{\theta}_{exc}$ to a d-axis exciter signal $i_{exc\_d}$ and q-axis exciter signal $i_{exc\_q}$ in a rotating d-q reference frame of the exciter excitation space vector harmonic; and
applying the exciter signals $i_{exc\_d}$ and $i_{exc\_q}$ to a PLL to output the estimated rotor position signal $\hat{\theta}$.

22. The FOC method of claim 21, wherein the polyphase synchronous machine comprises a three-phase synchronous machine.

23. The FOC method of claim 21, wherein the polyphase excitation for the exciter stator comprises three-phase excitation.

24. The FOC method of claim 21, wherein the polyphase excitation for the exciter stator comprises a non-rotating polyphase excitation waveform with fundamental frequency $F_{exc}$ of zero.

25. The FOC method of claim 24, wherein DC excitation provides the non-rotating polyphase excitation waveform.

26. The FOC method of claim 21, wherein the desired harmonic of the excitation frequency $F_{exc}$ is selected from the $-5^{th}$, $+7^{th}$, $-11^{th}$ and $+13^{th}$ harmonics of the excitation frequency $F_{exc}$.

27. The FOC method of claim 26, wherein the desired harmonic of the excitation frequency $F_{exc}$ is the $-5^{th}$ harmonic of the excitation frequency $F_{exc}$.

28. The FOC method of claim 26, wherein the desired harmonic of the excitation frequency $F_{exc}$ is the $+7^{th}$ harmonic of the excitation frequency $F_{exc}$.

29. A method of field oriented control (FOC) system for a three-phase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, the method comprising the steps of:
transforming electrical potentials for each phase of a three-phase excitation of frequency $F_{exc}$ for the exciter stator to an $\alpha$-axis excitation potential $v_{exc\_\alpha}$ and a $\beta$-axis excitation potential $v_{exc\_\beta}$ in a two-phase $\alpha$-$\beta$ stationary reference frame for an exciter excitation electrical potential space vector with a fundamental frequency $F_{exc}$;

applying a phase locked loop (PLL) to the two excitation potentials $v_{exc\_\alpha}$ and $v_{exc\_\beta}$ to output a signal that is representative of an estimated position $\hat{\theta}_{exc}$ of a space vector for the polyphase excitation with fundamental frequency $F_{exc}$;

filtering the signal representative of the estimated position $\hat{\theta}_{exc}$ to pass at least one desired harmonic of the excitation frequency $F_{exc}$ selected from the $-5^{th}$, $+7^{th}$, $-11^{th}$, and $+13^{th}$ harmonics of the excitation frequency $F_{exc}$;

transforming the exciter stator current signal representative of current on each phase of the polyphase exciter excitation to digital α-axis and β-axis exciter current signals $i_{exc\_\alpha}$ and $i_{exc\_\beta}$ in a two-phase stationary α-β reference frame of the exciter excitation space vector;

transforming the digital α-axis and β-axis exciter current signals $i_{exc\_\alpha}$ with the desired harmonic of $\hat{\theta}_{exc}$ to a d-axis exciter signal $i_{exc\_d}$ and q-axis exciter signal $i_{exc\_q}$ in a rotating d-q reference frame of the exciter excitation space vector harmonic; and applying the exciter signals $i_{exc\_d}$ and $i_{exc\_q}$ to a PLL to output the estimated rotor position signal $\hat{\theta}$.

30. The FOC method of claim 29, wherein the desired harmonic of the excitation frequency $F_{exc}$ is the $-5^{th}$ harmonic of the excitation frequency $F_{exc}$.

31. The FOC method of claim 29, wherein the desired harmonic of the excitation frequency $F_{exc}$ is the $+7^{th}$ harmonic of the excitation frequency $F_{exc}$.

32. For a field oriented control (FOC) system usable with a polyphase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, a method for generating the estimated rotor position signal $\hat{\theta}$ comprising the steps of:

transforming electrical potentials for each phase of a polyphase excitation of frequency $F_{exc}$ for the exciter stator to an α-axis excitation potential $v_{exc\_\alpha}$ and a β-axis excitation potential $v_{exc\_\beta}$ in a two-phase α-β stationary reference frame of an exciter excitation electrical potential space vector;

applying the two excitation potentials $v_{exc\_\alpha}$ and $v_{exc\_\beta}$ to a phase locked loop (PLL) to output a signal that is representative of an estimated position $\hat{\theta}_{exc}$ of a space vector for the polyphase excitation with fundamental frequency $F_{exc}$;

filtering the signal representative of the estimated position $\hat{\theta}_{exc}$ to pass at least one desired harmonic of the signal representative of the estimated position $\hat{\theta}_{exc}$;

transforming the exciter stator current signals representative of current on each phase of the polyphase exciter excitation to digital α-axis and β-axis exciter current signals $i_{exc\_\alpha}$ and $i_{exc\_\beta}$ in a two-phase stationary α-β reference frame of the exciter excitation space vector;

transforming the digital α-axis and β-axis exciter current signals $i_{exc\_\alpha}$ with the desired harmonic of $\hat{\theta}_{exc}$ to a d-axis exciter signal $i_{exc\_d}$ and q-axis exciter signal $i_{exc\_q}$ in a rotating d-q reference frame of the exciter excitation space vector harmonic; and applying the exciter signals $i_{exc\_d}$ and $i_{exc\_q}$ to a PLL to output the estimated rotor position signal $\hat{\theta}$.

33. The method of claim 32, wherein the polyphase synchronous machine comprises a three-phase synchronous machine.

34. The method of claim 32, wherein the polyphase excitation for the exciter stator comprises three-phase excitation.

35. The method of claim 32, wherein the desired harmonic of the excitation frequency $F_{exc}$ is selected from the $-5^{th}$, $+7^{th}$, $-11^{th}$ and $+13^{th}$ harmonics of the excitation frequency $F_{exc}$.

36. The method of claim 35, wherein the desired harmonic of the excitation frequency $F_{exc}$ is the $-5^{th}$ harmonic of the excitation frequency $F_{exc}$.

37. The method of claim 35, wherein the desired harmonic of the excitation frequency $F_{exc}$ is the $+7^{th}$ harmonic of the excitation frequency $F_{exc}$.

38. For a field oriented control (FOC) system usable with a three-phase brushless wound field synchronous machine that has a main stator, an exciter stator and a rotor assembly comprising a direct current (DC) main rotor wiring supplied by a rotating rectifier assembly that rectifies alternating current (AC) generated by an exciter rotor winding and that uses an estimated rotor position signal $\hat{\theta}$ for control of the machine, a method for generating the estimated rotor position signal $\hat{\theta}$ comprising the steps of:

transforming electrical potentials for each phase of a three-phase excitation of frequency $F_{exc}$ for the exciter stator to an α-axis excitation potential $v_{exc\_\alpha}$ and a β-axis excitation potential $v_{exc\_\beta}$ in a two-phase α-β stationary reference frame of an exciter excitation electrical potential space vector with a fundamental frequency of $F_{exc}$;

applying the two excitation potentials $v_{exc\_\alpha}$ and $v_{exc\_\beta}$ to a phase locked loop (PLL) to output a signal that is representative of an estimated position $\hat{\theta}_{exc}$ of the exciter excitation space vector;

filtering the signal that is representative of the estimated position $\hat{\theta}_{exc}$ to pass at least one desired harmonic of the excitation frequency $F_{exc}$ selected from the $-5^{th}$, $+7^{th}$, $-11^{th}$, and $+13^{th}$ harmonics of the excitation frequency $F_{exc}$;

transforming the exciter stator current signals representative of current on each phase of the polyphase exciter excitation to digital α-axis and β-axis exciter current signals $i_{exc\_\alpha}$ and $i_{exc\_\beta}$ in a two-phase stationary α-β reference frame of the exciter excitation space vector;

transforming the digital α-axis and β-axis exciter current signals $i_{exc\_\alpha}$ and uses the desired harmonic of $\hat{\theta}_{exc}$ to a d-axis exciter signal $i_{exc\_d}$ and q-axis exciter signal $i_{exc\_q}$ in a rotating d-q reference frame of the exciter excitation space vector harmonic; and applying $i_{exc\_d}$ and $i_{exc\_q}$ to a PLL to output the estimated rotor position signal $\hat{\theta}$.

39. The method of claim 38, wherein the desired harmonic of the excitation frequency $F_{exc}$ is the $-5^{th}$ harmonic of the excitation frequency $F_{exc}$.

40. The method of claim 38, wherein the desired harmonic of the excitation frequency $F_{exc}$ is the $+7^{th}$ harmonic of the excitation frequency $F_{exc}$.

* * * * *